United States Patent
Hollander et al.

(10) Patent No.: US 7,281,268 B2
(45) Date of Patent: Oct. 9, 2007

(54) SYSTEM, METHOD AND COMPUTER PROGRAM PRODUCT FOR DETECTION OF UNWANTED PROCESSES

(75) Inventors: Yona Hollander, Cupertino, CA (US); Oded Horovitz, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 315 days.

(21) Appl. No.: 11/055,197

(22) Filed: Feb. 10, 2005

(65) Prior Publication Data

US 2005/0177752 A1 Aug. 11, 2005

Related U.S. Application Data

(63) Continuation-in-part of application No. 10/874,433, filed on Jun. 22, 2004, which is a continuation of application No. 09/561,395, filed on Apr. 28, 2000, now Pat. No. 6,823,460.

(30) Foreign Application Priority Data

Nov. 14, 1999 (IL) ........................ 132916

(51) Int. Cl.
*H04L 9/00* (2006.01)
(52) U.S. Cl. ............. 726/22; 726/1; 713/187; 713/188; 713/189; 710/1; 710/100; 710/200; 710/240; 710/260
(58) Field of Classification Search ............ 726/22
See application file for complete search history.

(56) References Cited

U.S. PATENT DOCUMENTS 6,275,938 B1 *  8/2001  Bond et al. .............. 726/23

2003/0182572 A1 * 9/2003 Cowan et al. .............. 713/200
2005/0166001 A1 * 7/2005 Conover et al. ............ 711/100

OTHER PUBLICATIONS

Cowan et al., StackGuard: Automatic Adaptive detection and Prevention of Buffer-Overflow Attacks, 7th USENIX Security Symposium, 1998.*

Baratloo et al., Transparent Run-time Defense against Stack-Smashing Attacks, USENIX Annual Conference, general Session, Jun. 2000.*

(Continued)

*Primary Examiner*—Taghi Arani
(74) *Attorney, Agent, or Firm*—Zilka-Kotab, PC; Christopher J. Hamaty (57) ABSTRACT

A system, method and computer program product are provided which are capable of intercepting a call. Once intercepted, it is determined whether the call is associated with a previous sequence of calls in order to identify a correct sequence of calls associated with the intercepted call. Next, the call is associated with the correct sequence of calls. State information that is associated with the call is then gathered. Further, sequence state information is updated, and it is determined whether a process is unwanted based, at least in part, on such sequence state information. If it is determined that the process is unwanted, a reaction may be made to the unwanted process. If it is not determined that the process is unwanted, a next call may be intercepted, and so on.

19 Claims, 7 Drawing Sheets

OTHER PUBLICATIONS

Cowan, Cripsin, "Array Bounds Checking for C" http://www.usenix.org/publication/library/proceedings/sec98/full_papers/cowan/cowan_html/node23.html.

Cowan, Crispin, "Memory Access Checking" http://www.usemix.org/publications/library/proceedings/sec98/full_papers/cowan/cowan_html/node24.html.

Cowan, Crispin, "Type-Safe Languages" http://www.usnix.org/publications/library/proceedings/sec98/full_papers/cowan/cowan_html/node25.html.

Cowan, Crispin, "Conclusions" http://www.usenix.org/publications/library/proceedings/sec98/full_papers/cowan/cowan_html/node26.html.

Cowan, Crispin, "Availability" http://www.usenix.org/publications/library/proceedings/sec98/full_papers/cowan/cowan_html/node27.html.

"References" http://www.usenix.org/publications/library/proceedings/sec98/full_papers/cowan/cowan_html/node28.html.

* cited by examiner

SYSTEM, METHOD AND COMPUTER PROGRAM PRODUCT FOR DETECTION OF UNWANTED PROCESSES

RELATED APPLICATION(S)

The present application is a continuation-in-part of a application filed Jun. 22, 2004 under application Ser. No. 10/874,433, which, in turn, is a continuation of an application Ser. No 09/561,395 filed Apr. 28, 2000 and now issued under U.S. Pat. No. 6,823,460, which, in turn, claimed priority from an Israeli patent application filed Nov. 14, 1999 under application Ser. No. 132916, which are each incorporated herein by reference in their entirety for all purposes.

FIELD OF THE INVENTION

The present invention relates to computer/network security systems, and more particularly, to detecting/preventing unwanted processes.

BACKGROUND OF THE INVENTION

In the space of just a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again.

Many techniques have been used to prevent and detect unwanted processes and the various related malicious functionality resulting therefrom. For example, signature-based identification may be used to detect a threat using an associated signature. Specifically, once malicious code is detected, a signature, or definition, may be created for use in detecting future threats resulting from the detected malicious code.

Unfortunately, it takes a predetermined amount of time for such signatures associated with new malicious code to be distributed for use. Further, the speed with which malicious code propagates has increased significantly from a matter of weeks to a matter of hours. To this end, signature-based malicious code identification leaves computers/networks vulnerable for a significant time period from the initial proliferation of the malicious code until the distribution of the associated signature.

To compensate for the aforementioned vulnerability, behavioral heuristics have been used, which employ heuristics that employ a context of malicious operations in order to detect malicious code. In other words, behavioral heuristic techniques do not attempt to identify the malicious code, itself per se, but rather identify various computer/network functionality that is likely indicative of new malicious code.

Unfortunately, however, behavioral heuristic-based techniques are subject to false positives (i.e., situations where the techniques indicate that malicious code exists, when, in fact, it does not). Such false positive conditions often arise when certain functionality that is deemed to be malicious is also performed for benign purposes.

There is thus a need for a technique that provides the real-time protection of behavioral heuristics, with the additional accuracy (and less false positives) that is traditionally provided by signature-based scanning. Further, there is a need for overcoming these and/or other problems associated with the prior art.

SUMMARY

A system, method and computer program product are provided which are capable of intercepting a call. Once intercepted, it is determined whether the call is associated with a previous sequence of calls in order to identify a correct sequence of calls associated with the intercepted call. Next, the call is associated with the correct sequence of calls. State information that is associated with the call is then gathered. Further, sequence state information is updated, and it is determined whether a process is unwanted based, at least in part, on such sequence state information. If it is determined that the process is unwanted, a reaction may be made to the unwanted process. If it is not determined that the process is unwanted, a next call may be intercepted, and so on.

DETAILED DESCRIPTION

Figure 1:
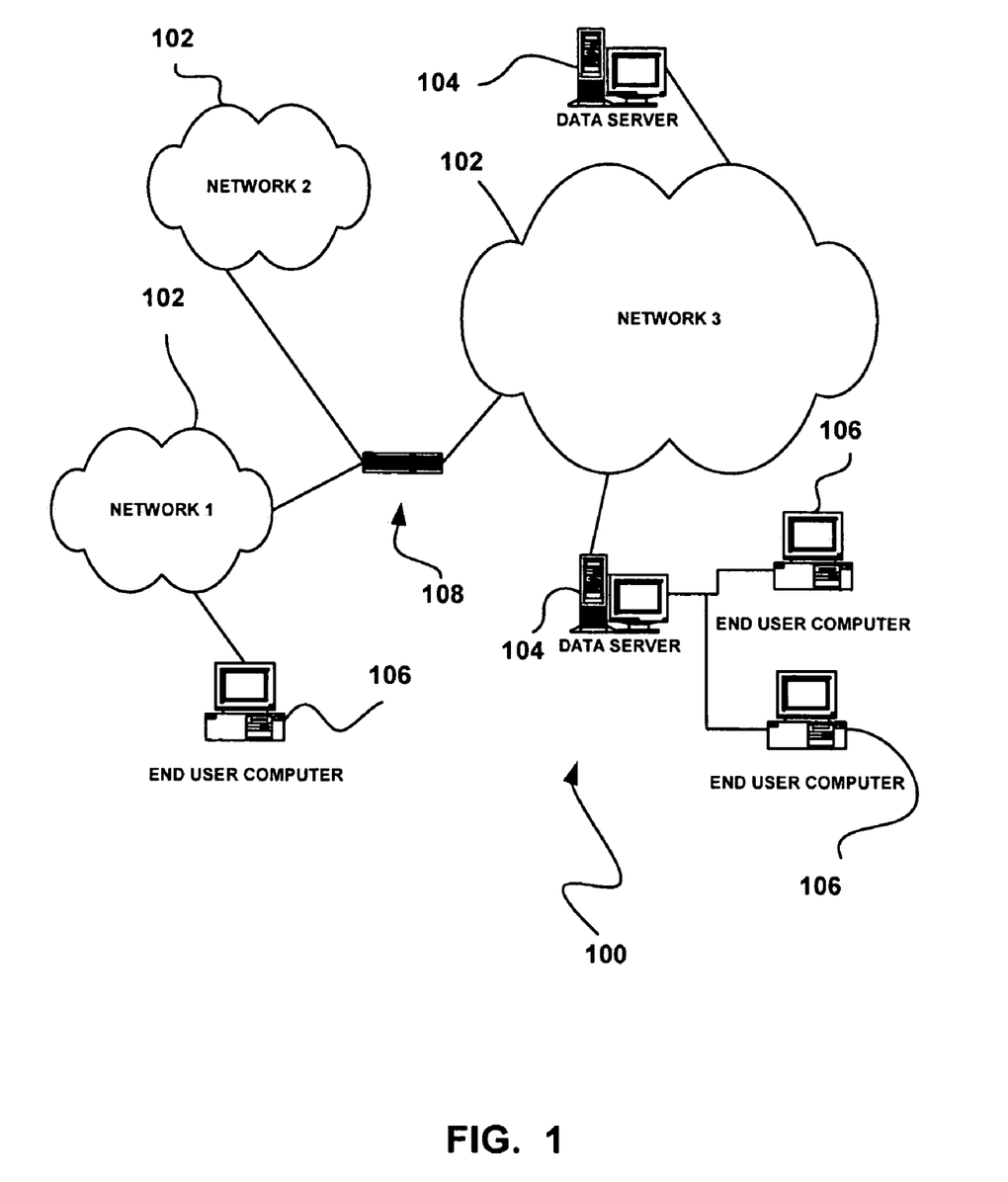
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a scanner, a firewall, intrusion detection/prevention system, etc. for purposes that will be set forth hereinafter in greater detail.

Figure 2:
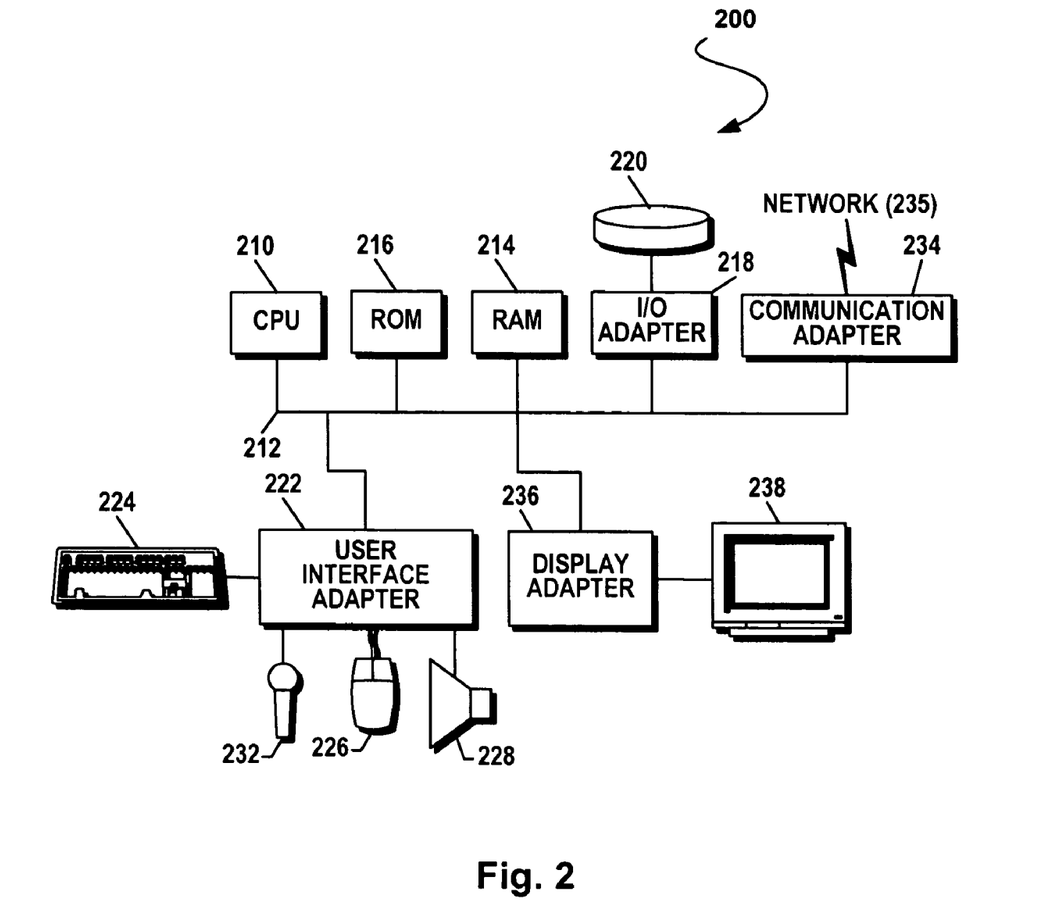
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
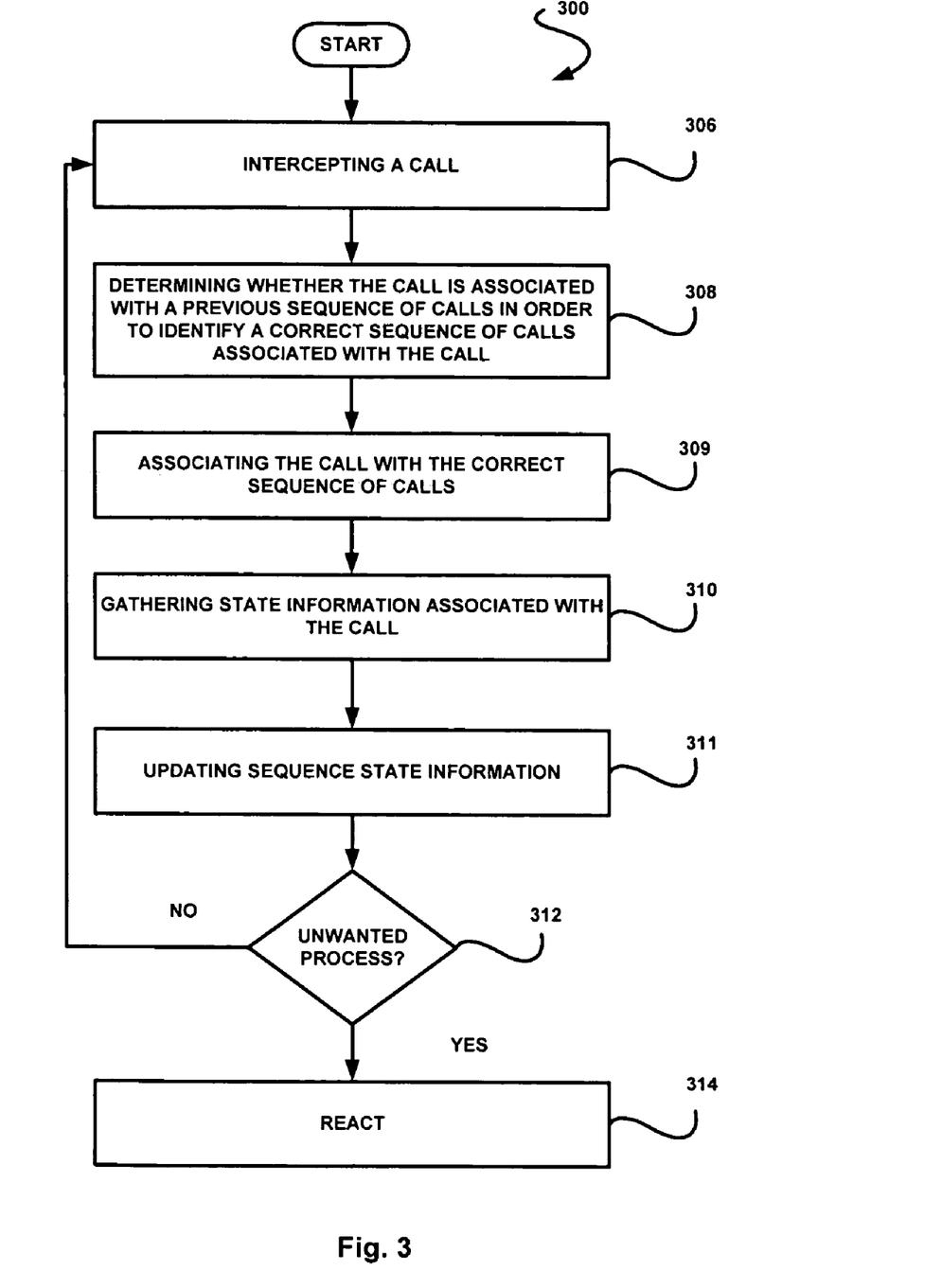
FIG. 3 shows a security method for determining processes to be unwanted based on gathered state information, in accordance with one embodiment.

FIG. 3 shows a security method 300 for determining processes to be unwanted based on gathered state information, in accordance with one embodiment. As an option, the security method 300 may be implemented in the context of the architecture and environment of FIGS. 1 and/or 2. Of course, however, the security method 300 may be carried out in any desired environment.

The security method 300 may begin by intercepting a call, in operation 306. In the context of the present description, the call may include a system call, a user mode call, a kernel mode call, an application program interface (API) call, a function call, a network message call, a remote procedure call, a queued message call, a calling routine, and/or any other code and/or function that is capable of invoking and/or executing another code and/or function. Still, the act of intercepting may refer to any technique of capturing, monitoring, interrupting, and/or any other act capable of allowing a user to associate the call with a correct sequence of calls, and/or gather state information associated with the call, in the manner that will soon be set forth in greater detail. As an option, the call may include detailed information, such as a call name, optional parameters, and/or an outcome of the call (i.e. return code); although any information associated with the call may or may not be included.

It is next determined, in operation 308, whether the call is associated with a previous sequence of calls in order to identify a correct sequence of calls associated with the call. It should be noted that, in use, calls may be generated in a sequence to produce an intended resulting function. Further, a plurality of sequences of calls may be generated simultaneously and/or in parallel. As a result, each consecutively intercepted call may or may not be associated with the same sequence.

To this end, the determination of operation 308 aids in associating the call with a correct sequence of calls in operation 309. In the context of the present description, such correct sequence of calls involves the sequence of calls which, with the present intercepted call, accomplish the corresponding intended overall functionality. Of course, operations 308-309 may employ any characteristics, heuristics, or any other identifying aspect of the calls in order to associate the same with the correct sequence of calls.

Next, in operation 310, state information associated with the call is gathered. State information includes any sort of indication that an associated process (which may be initiated by a corresponding file, etc.) is suspicious, is non-suspicious, includes malicious code, possibly includes malicious code, and/or is indicative of a state of the call and may be used to later determine whether the process is unwanted, as will soon be set forth. As an option, the state information may also include an argument to the call (i.e. usually an object of the call and a desired operation on the object), and an outcome of the call (i.e. return code and/or other status information).

Sequence state information is also updated based the gathered state information, as indicated in operation 311. As mentioned previously, the calls have an associated sequence of calls. Further, in the manner that each individual call has associated state information, the sequence of calls may have collective sequence state information.

In the context of the present description, similar to the state information, the sequence state information may include any sort of indication that an associated process is suspicious, is non-suspicious, includes malicious code, possibly includes malicious code, and/or is indicative of a state of the call and may be used to later determine whether the process is unwanted, as will soon be set forth. Thus, since the sequence state information may include any information that is indicative of a state of the sequence of calls, the interception of a new call may require that the sequence state information be updated so that the sequence state information reflects the state information associated with the newly intercepted call.

With this framework of intercepting calls and gathering and updating state information/sequence state information, various measures may be taken to manage unwanted processes using this collected information. Specifically, the sequence state information about the identified sequence of calls may be utilized in determining whether an associated process is unwanted. Note decision 312.

In the context of the present description, an unwanted process may refer to any process that is determined to be at least partially and/or potentially unwanted (e.g. suspicious, etc.). To this end, the method 300 may be used to detect and/or manage not only malicious code (i.e. malware, etc.), but also spyware, etc. Malware traditionally refers to computer viruses, worms, Trojan horses, etc. Spyware, while not as malicious as the aforementioned conventional viruses, Trojan horses, etc., may still cause problems for computer users. For example, spyware may be designed to log keystrokes, track which websites a computer user visits, and/or transmit personal information to a third party. In the context of the present description, the term spyware is further deemed to include other related types of similar software such as adware, dialer software, other equivalents, and/or any other software that is less malicious than conventional malware.

With continuing reference to FIG. 3, if it is not determined in decision 312 that the process is unwanted based, at least in part, on the sequence state information, the method 300 returns to intercepting a next call in operation 306. Further, the method 300 continues in attempting to identify unwanted processes using updated sequence state information, reflecting newly intercepted calls.

On the other hand, if it is determined in decision 312 that the process is unwanted, a reaction is made with regard to the process, in operation 314. Such reactions may include, but are not limited to, terminating the process, quarantining the process, alerting a user/administrator of the process, reporting the process, further analyzing the process, and/or any other appropriate measure that is deemed appropriate for the unwanted process.

Upon the realization that a process is unwanted, it is also possible that a whole collection of processes may become unwanted (e.g. "dropper" processes that deliver the unwanted process, etc.). Therefore, it is possible that a reaction may be made with respect to such processes, as well. In addition, the state information for each unwanted process may contain a collection of unwanted objects (e.g. files, etc.) that may also be quarantined, deleted, and/or treated in any other way that suits the condition on which the process was determined to be unwanted.

As will soon become apparent, the sequence state information may provide an indication of various degrees in which the associated process is unwanted (e.g. suspicious, malicious, etc.), and different appropriate reactive measures may be carried out accordingly. As a further option, different state machines may optionally be employed, each for monitoring certain unwanted processes by detecting sequence state information that is particularly indicative of such unwanted processes. More optional information on such aspects will be set forth hereinafter in greater detail during reference to subsequent figures.

The present method 300 thus allows for aggregate state information to be gathered according to sequences of calls, which in turn allows for more accurate detection of unwanted processes. To this end, the present method 300 may optionally provide more real-time protection, with the additional accuracy (and less false positives), as well as other optional advantages.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
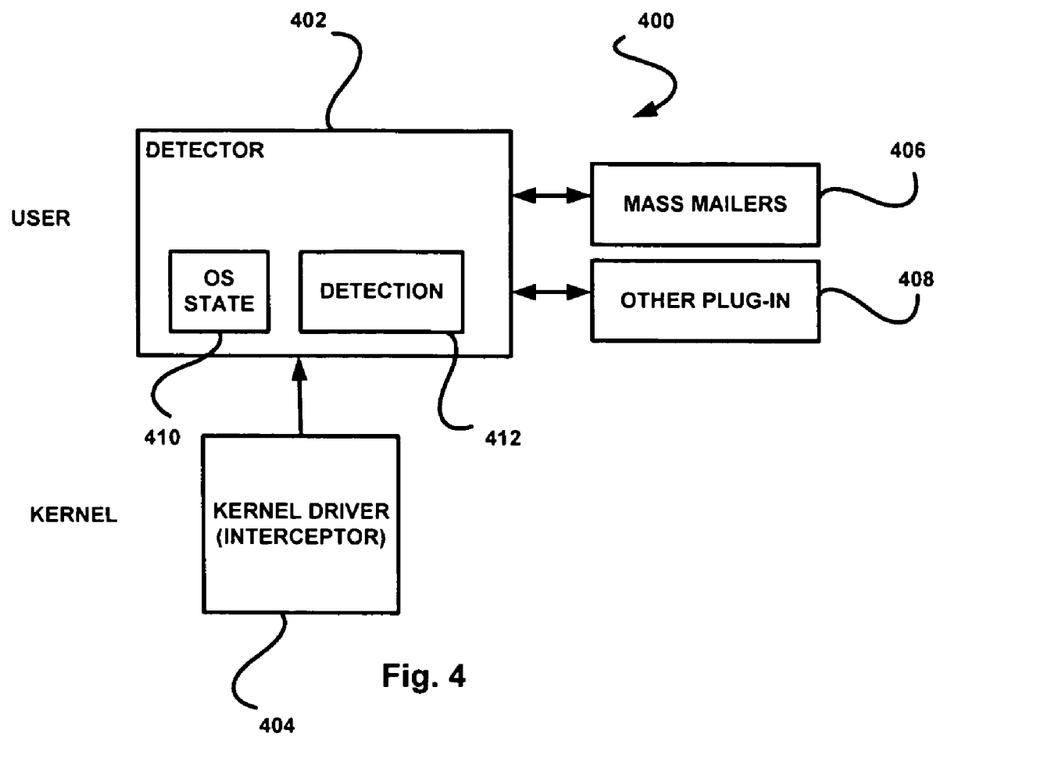
FIG. 4 shows one exemplary architecture of implementing a security method, in accordance with another embodiment.

FIG. 4 shows one exemplary architecture 400 of implementing a security method (i.e. security method 300 of FIG. 3, etc.) in accordance with another embodiment. As an option, the exemplary architecture 400 may be implemented in the context of the details of FIGS. 1-2. Of course, however, the exemplary security architecture 400 may be carried out in any desired environment.

As shown, the architecture 400 includes a detector 402, an interceptor (i.e. kernel driver 404, etc.), and a plurality of state machines 406 and 408. The state machines 406 and 408 may include a mass-mailer state machine, and/or any other state machines that are associated with an unwanted process. Further, the state machines 406 and 408 may be provided utilizing a plug-in interface, or any other interface capable of communicating with the detector 402.

The detector 402 includes an operating system state module 410 and a detection module 412. In addition, the detector 402 includes an infrastructure for defining and running the state machines 406 and 408. It should be noted that the above disclosed architecture 400 is only one mode of implementing the security method 300 of FIG. 3, and any desired architecture may be utilized in the implementation of such security technique.

In the present embodiment, the kernel driver 404 may be used to intercept a call and forward such call to the detector 402. When the detector 402 starts to run, it may identify a plurality of running processes and/or open handles. Such identification may be used to provide immediate protection without having to restart an associated system.

Upon interception of the call, the detector 402 then aggregates data (i.e. name, parameters, etc.) associated with the call. This type of aggregation may be used to identify a correct sequence of calls associated with the current call.

Next, the state machines 406 and 408 send state information associated with the call to the detector 402. In one particular example which will be elaborated upon during the description of subsequent figures, the first state of one of the state machines 406 and 408 may be a write operation executed by an electronic message client. Further, the states of the appropriate state machine following the first state may depend on a file extension associated with the process. Further during use, the state machines 406 and 408 may also be capable of monitoring files and executables affected by saved files. Thus, sequence state information is collected.

The detector 402 may also determine whether the first state and following states are suspicious. If at least one of the first state and following states are determined to be suspicious, additional information (i.e. sequence state information, etc.) may be collected, in the foregoing manner. Once additional information is collected, such additional information may be utilized in determining whether a process associated with the call is unwanted. Once the detector 402 reaches a state (as indicated, at least in part, by the sequence state information) that suggests a process associated with the call is unwanted (i.e. malicious, etc.), the process may be terminated in real-time.

As an option, marking the call as suspicious may allow for an intermediate categorization of the call. In this way, additional information may be required before determining that a process associated with the call is malicious. This technique thus allows for a more accurate determination of whether the call is in fact malicious.

Figure 5:
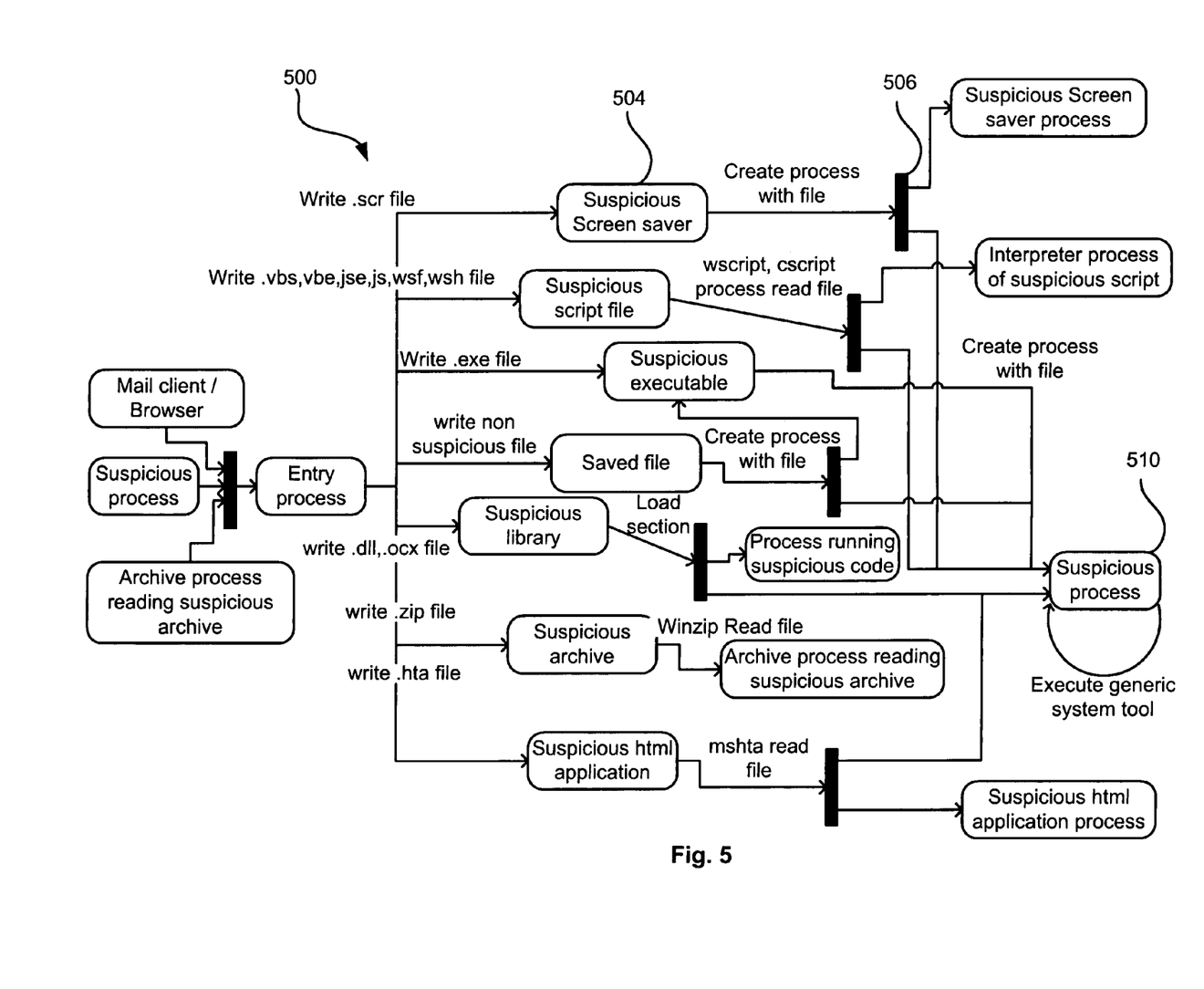
FIG. 5 shows a method of tracking states of processes associated with system calls in order to determine if the processes are suspicious, in accordance with yet another embodiment.

FIG. 5 shows a method 500 of tracking states of processes associated with system calls in order to determine if the processes are suspicious, in accordance with yet another embodiment. As an option, the method 500 may be implemented in the context of the architecture and environment of the previous figures. Of course, however, the method 500 may be carried out in any desired environment.

In the present embodiment, files saved in an electronic mail (i.e. "email") client are tracked utilizing a mass-mailer state machine (not shown). Initially, a write operation 504 is performed by an email client, which creates first state information (i.e. starting state information) indicative of the write operation 504. The first state information associated with such write operation 504 may include writing a suspicious screensaver, script file, executable, library, archive, office document, HTML document, or anything else capable of being written by an email client. Next state information is then selected depending on the file extension associated with the write operation 504. Note operation 506.

Depending on the first and/or next state information, the write operation 504 may be determined to be suspicious in operation 510. If the next state information indicates that the write operation 504 is not suspicious, the method 500 returns to tracking the state of the original suspicious operation. In addition, once a process is determined to be suspicious in operation 510, the suspicious process state information becomes the first state information, for further tracking purposes. See FIGS. 6-7, for example.

More exemplary information regarding the method 500 is set forth in Table 1 below. It should be noted, however, that the contents of such table is set forth for illustrative purposes only, and should not be construed as limiting in any manner.

TABLE 1

| Operation | State | Operation | State |
|---|---|---|---|
| Write .scr file | Suspicious screen saver | Create process with file | Suspicious process* |
| Write .vbs, .vse, .jse, .js, .wsf, .wsh file | Suspicious script file | Wscript, cscript process the file | Suspicious process* |
| Write .exe file | Suspicious executable file | Create process with file | Suspicious process |
| Write non suspicious file | Saved File | Create process with file | Suspicious process/ Suspicious executable file |
| Write .dll, .ocx, .cpl | Suspicious library | Load section | Suspicious process |
| Write .zip, .rar file | Suspicious archive | WInzip reads the file | Archive process reading suspicious archive** |
| Write .xls, .xlw, .ppt, .pot file | Suspicious office document | Office app reads the file | Suspicious process* |
| Write .hta file | Suspicious html application | Mshta reads the file | Suspicious process* |

Notes:
*In FIG. 5, another specific state is added.
In the present table, a non suspicious file is one that has any other extension but was saved by an email client. Since it is possible to execute these files, they are tracked. In this specific case there is double transition, one for the suspicious process state and the other one to the suspicious executable file state.
**In the archive file case, it is noted that the WinZip program read a suspicious file and later might write it, thus generating a suspicious file. Also, it is noted that the suspicious process state is another "starting" state. If a suspicious process writes a file, the state machine is followed again recursively.

Figure 6:
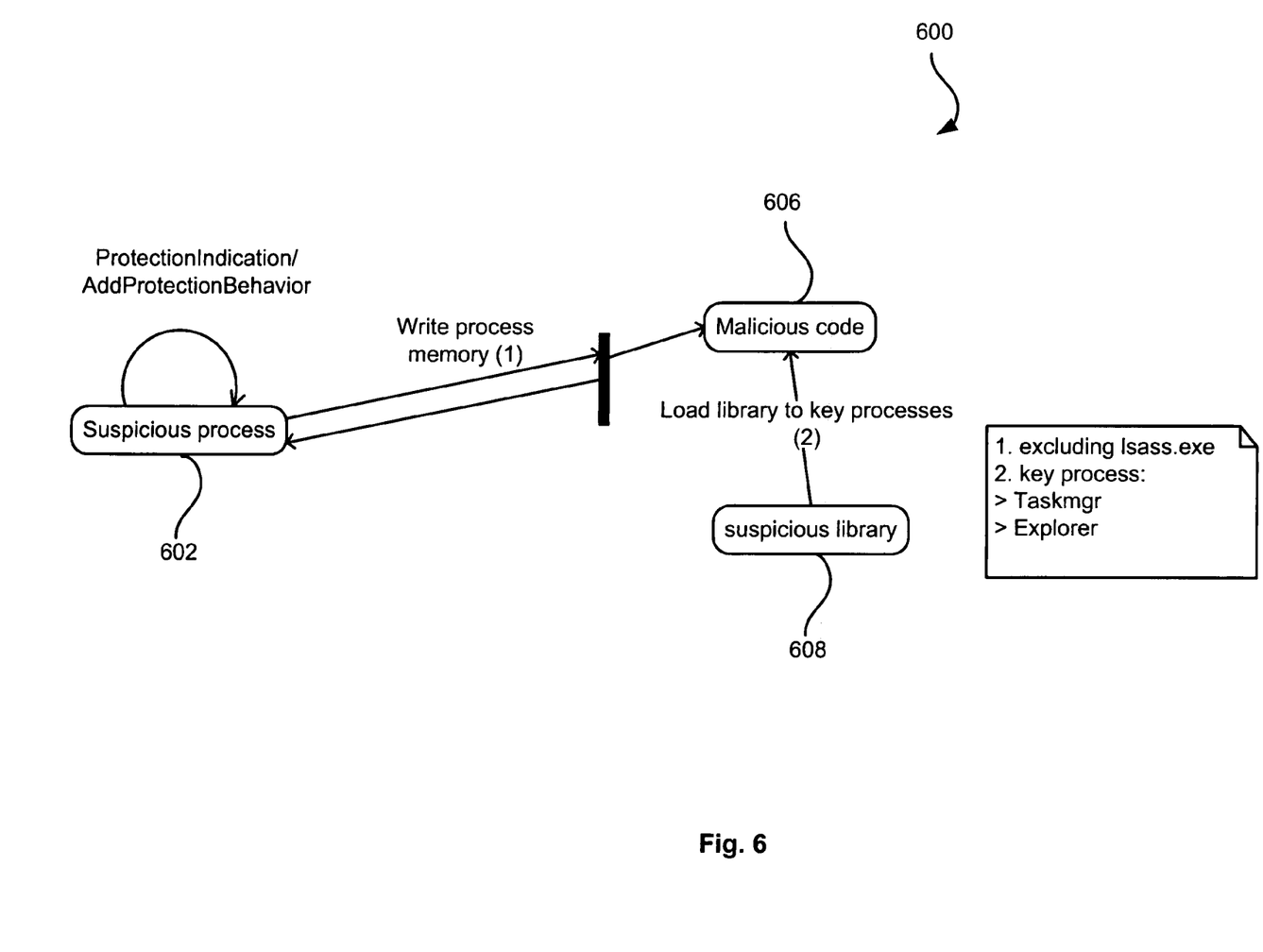
FIG. 6 shows a method of gathering additional information on processes determined to be suspicious in order to further determine whether the processes are malicious, in accordance with still yet another embodiment.

FIG. 6 shows a method 600 of gathering additional information on processes determined to be suspicious in order to further determine whether the processes are malicious, in accordance with still yet another embodiment. As an option, the method 600 may be implemented in the context of the architecture and environment of the previous figures. Of course, however, the method 600 may be carried out in any desired environment.

Initially, a suspicious process 602 is identified as described in FIG. 5. In some instances, the suspicious process 602 may immediately be determined to be malicious. For example, the suspicious process 602 may use a write to (other) process memory. Immediately, the state of the suspicious process 602 is no longer suspicious, but instead is characterized as malicious code 606.

In another example, a library 608 determined to be suspicious, as described in FIG. 5, may load a Microsoft® task manager process and a Microsoft® Explorer® process. Immediately, the suspicious library 608 is determined to also be malicious code 606. It should be understood that the above mentioned examples are only a limited number of instances where suspicious processes may be instantly characterized as malicious, and that additional instances exist.

Figure 7:
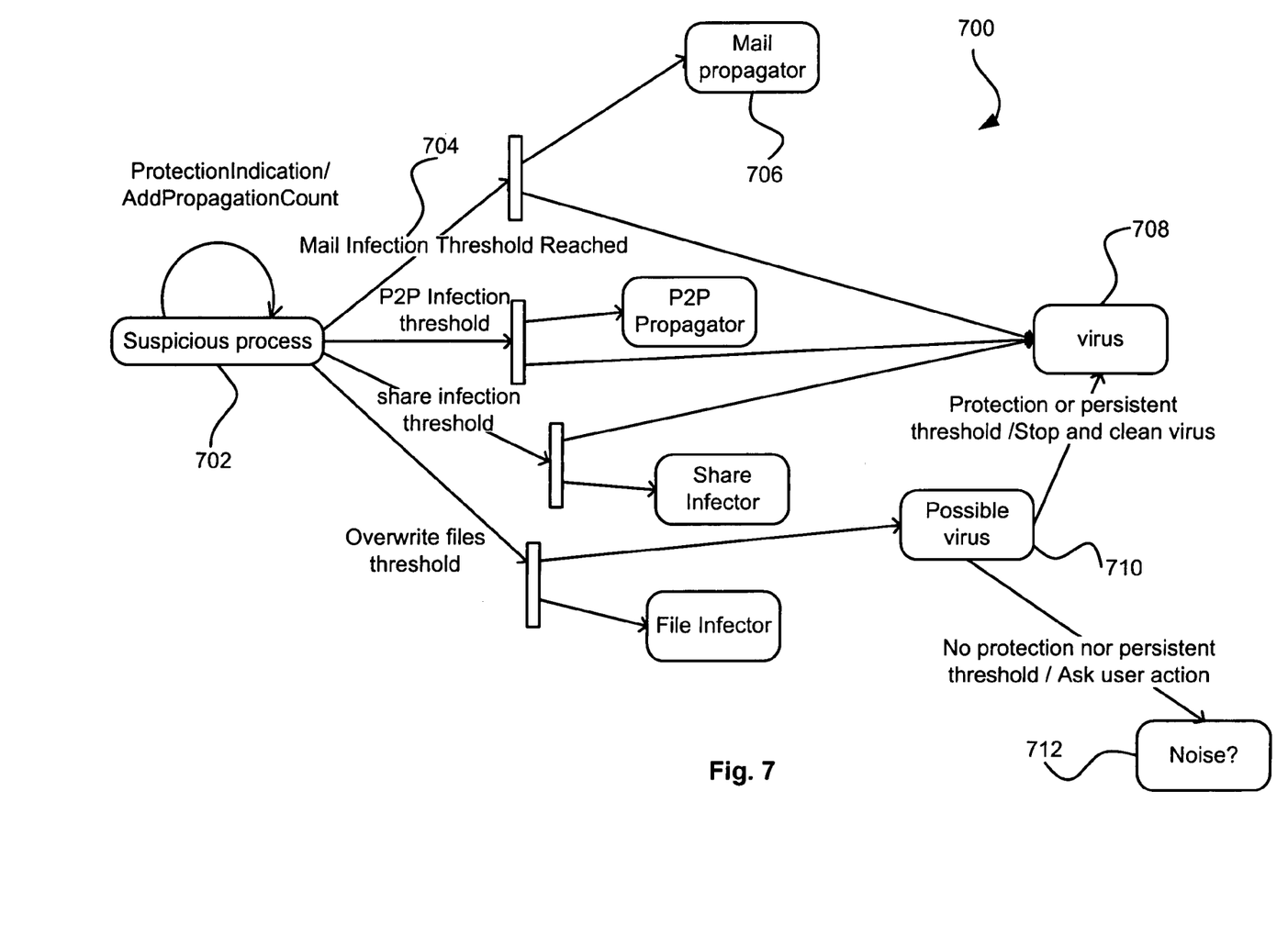
FIG. 7 shows a method of gathering additional information on processes determined to be suspicious in order to further determine whether the processes are malicious, in accordance with even still yet another embodiment.

FIG. 7 shows a method 700 of gathering additional information on processes determined to be suspicious in order to further determine whether the processes are malicious, in accordance with even still yet another embodiment. As an option, the method 700 may be implemented in the context of the architecture and environment of the previous figures. Of course, however, the method 700 may be carried out in any desired environment.

In some instances, a suspicious process may perform propagation actions. After a process is determined to be a suspicious process 702, which may be determined per the method 500 of FIG. 5, for example, the suspicious process 702 may further reach a certain threshold 704. Examples of such thresholds 704 are further described in Table 2, although any other threshold that may change the state of a suspicious process 702 may be utilized.

TABLE 2

| Operation | Threshold | State |
|---|---|---|
| Sending emails | 2 emails connections made | Virus - apply prevention |
| Write files to P2P directories | 10 files were written | Virus - apply prevention |
| Overwrite files | | Possible Virus - not determined at this point |
| Write files into a share | 10 files were written | Virus - apply prevention |

In one optional embodiment, again in the context of operation 308 of FIG. 3, logic may be used in order to consider an operation as a state transition. For example, the above "write files to P2P directories" may imply that logic decisions exist in the system which, in this case, can determine the following: 1) that a file write operation occurred, 2) that the file name has social engineering properties, and 3) that the file name has a suspicious extension. It should be noted that this is not the only operation that may trigger a state transition. Instead, any combination of an intercepted operation and logic decision may lead to associating an intercepted call with a sequence of calls.

Meeting the certain threshold creates a new state of the suspicious process 702, such that the suspicious process 702 may be determined to be a specific infector 706, a virus 708, or a possible virus 710. Of course, the suspicious process 702 may be determined to be any other state based on the threshold 704. If the process is determined to be a possible virus 710, for example, additional information on the suspicious process 702 may be gathered to determine if the suspicious process 702 is a virus 708 or just noise 712.

Again, it should be strongly noted that foregoing examples of architecture/operation of FIGS. 4-7 are set forth for illustrative purposes and should not be construed as limiting in any manner. Any of the pertinent features, operation, techniques may be optionally incorporated with or without the exclusion of other features described, and still fall within the scope of the claims.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A security method, comprising:
(a) intercepting a call;
(b) determining whether the call is associated with a previous sequence of calls in order to identify a correct sequence of calls associated with the call;
(c) associating the call with the correct sequence of calls;
(d) gathering state information associated with the call;
(e) updating sequence state information;
(f) determining whether a process is unwanted based, at least in part, on the sequence state information;
(g) if it is determined that the process is unwanted, reacting to the unwanted process;
(h) if it is not determined that the process is unwanted, repeating (a)-(f); wherein a kernel driver intercepts the call and forwards the call to a detector; wherein the detector includes an infrastructure for providing a state machine.

2. The method as recited in claim 1, wherein the call is selected from the group consisting of a system call, a user mode call, a kernel mode call, a function call, a network message call, a remote procedure call, a queued message call, an application program interface (API) call, and a calling routine.

3. The method as recited in claim 1, wherein the state information is selected from the group consisting of a name of the call, optional parameters, and an outcome of the call.

4. The method as recited in claim 1, wherein the state information includes a name of the call, optional parameters, and an outcome of the call.

5. The method as recited in claim 1, wherein the reacting includes terminating the unwanted process.

6. The method as recited in claim 1, wherein the state machine is provided utilizing a plug-in interface.

7. The method as recited in claim 1, wherein the state machine monitors files and executables affected by saved files.

8. The method as recited in claim 1, wherein a first state of the state machine is a write operation executed by an electronic message client.

9. The method as recited in claim 8, wherein states of the state machine following the first state depend on a file extension associated with the process.

10. The method as recited in claim 9, wherein it is determined whether the first state and following states are suspicious.

11. The method as recited in claim 10, wherein additional information is collected if it is determined that at least one of the first state and the following states are suspicious.

12. The method as recited in claim 11, wherein the additional information is utilized in determining whether the process is unwanted.

13. The method as recited in claim 1, wherein associating the call with the previous sequence of calls includes chaining the call to the sequence of calls.

14. A security method, comprising:
intercepting a call;
determining whether the call is associated with a previous sequence of calls in order to identify a correct sequence of calls associated with the call;
associating the call with the correct sequence of calls;
gathering state information associated with the call;
updating sequence state information;
determining whether a process is unwanted based, at least in part, on the sequence state information;
if it is determined that the process is unwanted, reacting to the unwanted process;
if it is not determined that the process is unwanted, repeating the intercepting, determining, associating, gathering, updating, and determining;
wherein a kernel driver intercepts the call and forwards the call to a detector;
wherein the detector identifies a plurality of running processes.

15. A security method, comprising:
intercepting a call;
determining whether the call is associated with a previous sequence of calls in order to identify a correct sequence of calls associated with the call;
associating the call with the correct sequence of calls;
gathering state information associated with the call;
updating sequence state information;
determining whether a process its unwanted based, at least in part, on the sequence state information;
if it is determined that the process is unwanted, reacting to the unwanted process;
if it is not determined that the process is unwanted, repeating the intercepting, determining, associating, gathering, updating, and determining;
wherein a kernel driver intercepts the call and forwards the call to a detector,
wherein the detector identifies a plurality of open handles.

16. A security computer program product embodied on a computer readable medium, comprising:
(a) computer code for intercepting a call;
(b) computer code for determining whether the call is associated with a previous sequence of calls in order to identify a correct sequence of calls associated with the call;
(c) computer code for associating the call with the correct sequence of calls;
(d) computer code for gathering state information associated with the call;
(e) computer code for updating sequence state information;
(f) computer code for determining whether a process is unwanted based, at least in part, on the sequence state information;
(g) computer code for reacting to the unwanted process, if it is determined that the process is unwanted;
(h) computer code for repeating execution of computer code (a)-(f), if it is not determined that the process is unwanted;
wherein a kernel driver intercepts the call and forwards the call to a detector;
wherein the detector includes an infrastructure for providing a state machine 17. A security system comprising:
an interceptor for intercepting a call;
wherein it is determined whether the call is associated with a previous sequence of calls in order to identify a correct sequence of calls associated with the call; the call is associated with the correct sequence of calls; state information associated with the call is gathered; sequence state information is updated; it is determined whether a process is unwanted based, at least in part, on the sequence state information; and reacting to the unwanted process if it is determined that the process is unwanted;

wherein a kernel driver intercepts the call and forwards the call to a detector;

wherein the detector includes an infrastructure for providing a state machine.

18. A security system, comprising:

an interceptor for intercepting a call;

wherein it is determined whether the call is associated with a previous sequence of calls in order to identify a correct sequence of calls associated with the call; the call is associated with the correct sequence of calls; state information associated with the call is gathered; sequence state information is updated; it is determined whether a process is unwanted based, at least in part, on the sequence state information; and reacting to the unwanted process if it is determined that the process is unwanted;

wherein a kernel driver intercepts the call and forwards the call to a detector;

wherein the detector identifies a plurality of running processes.

19. A security system, comprising:

an interceptor for intercepting a call;

wherein it is determined whether the call is associated with a previous sequence of call; in order to identify a correct sequence of calls associated with the call, the call is associated with the correct sequence of calls, state information associated with the call is gathered; sequence state information is updated; it is determined whether a process is unwanted based, at least in part, on the sequence state information; and reacting to the unwanted process if it is determined that the process is unwanted;

wherein a kernel driver intercepts the call and forwards the call to a detector;

wherein the detector identifies a plurality of open handles.

* * * * *

UNITED STATES PATENT AND TRADEMARK OFFICE
CERTIFICATE OF CORRECTION

PATENT NO. : 7,281,268 B2  Page 1 of 1
APPLICATION NO. : 11/055197
DATED : October 9, 2007
INVENTOR(S) : Hollander et al.

It is certified that error appears in the above-identified patent and that said Letters Patent is hereby corrected as shown below:

Col. 10, line 28 replace "its" with --is--;
Col. 10, line 36 replace "detector," with --detector;--;
Col. 10, line 62 replace "machine" with --machine.--;
Col. 12, line 8 replace "call;" with --calls--;
Col. 12, line 9 replace "call," with --call;--;
Col. 12, line 10 replace "calls," with --calls;--.

Signed and Sealed this

Twelfth Day of October, 2010

David J. Kappos
*Director of the United States Patent and Trademark Office*